US012320470B2

(12) United States Patent
Oishi

(10) Patent No.: US 12,320,470 B2
(45) Date of Patent: Jun. 3, 2025

(54) MOUNTING BRACKET FOR AN AIR TANK SYSTEM

(71) Applicant: Universal Air, Inc., San Bernardino, CA (US)

(72) Inventor: Yuzuru Oishi, Apple Valley, CA (US)

(73) Assignee: Universal Air, Inc.

( * ) Notice: Subject to any disclaimer, the term of this patent is extended or adjusted under 35 U.S.C. 154(b) by 4 days.

(21) Appl. No.: 18/163,249

(22) Filed: Feb. 1, 2023

(65) Prior Publication Data

US 2023/0250837 A1     Aug. 10, 2023

Related U.S. Application Data

(60) Provisional application No. 63/267,689, filed on Feb. 8, 2022.

(51) Int. Cl.
*F16M 5/00*     (2006.01)

(52) U.S. Cl.
CPC ......... *F16M 5/00* (2013.01); *F04C 2230/604* (2013.01)

(58) Field of Classification Search
CPC .... F16M 3/00; F16M 5/00; F15B 1/04; F04B 39/12; F04B 39/14; F04B 53/22; F04C 13/04; F04C 2230/604; F17C 13/04
USPC ...... 248/674, 675; 137/376, 899.4; 417/360, 417/362
See application file for complete search history.

(56) References Cited

U.S. PATENT DOCUMENTS

| | | | |
|---|---|---|---|
| 1,771,889 A | | 7/1930 | Hobart |
| 1,804,876 A | * | 5/1931 | Jamieson ............ F04B 39/0011 |
| | | | 417/101 |
| 2,116,642 A | * | 5/1938 | Richter ..................... B23K 5/22 |
| | | | 48/190 |
| 2,885,165 A | * | 5/1959 | Smolen ..................... F16M 5/00 |
| | | | 269/296 |
| 4,722,673 A | | 2/1988 | Grime |
| 5,030,067 A | | 7/1991 | Ushiota |
| 5,054,740 A | * | 10/1991 | Wheeler ................ F16M 11/22 |
| | | | 248/154 |
| 5,520,519 A | | 5/1996 | Birkeland |
| 5,725,195 A | * | 3/1998 | Cotter ................. F15B 15/1428 |
| | | | 248/674 |
| D444,798 S | * | 7/2001 | Morgan .......................... D15/9 |
| 6,485,269 B1 | | 11/2002 | Matthew |
| 7,186,095 B2 | | 3/2007 | Skinner |

(Continued)

FOREIGN PATENT DOCUMENTS

CN     213057037 U     4/2021

*Primary Examiner* — Jonathan Liu
*Assistant Examiner* — Guang H Guan
(74) *Attorney, Agent, or Firm* — DANE IP Law PC

(57) ABSTRACT

An air tank system where the system's components may be mounted to the outer surface of the air tank is disclosed. The air tank may have a plurality of external rods orientated longitudinally along the outer surface of its body and connected to the end caps of the air tank for attaching mounting brackets to the external rods. The mounting brackets are configured for components, such as an air compressor or a manifold valve, to be mounted on them. The mounting bracket may have a first and second member, each slidable across the external rods independent from each other, configured to adjust to the different sizes of the components that are desired to be mounted on the air tank.

16 Claims, 18 Drawing Sheets

(56) References Cited

U.S. PATENT DOCUMENTS

| | | | | |
|---|---|---|---|---|
| 7,406,874 B2* | 8/2008 | Carnal | ................... | G01N 17/04 |
| | | | | 73/706 |
| 8,282,363 B2* | 10/2012 | Ohi | ........................ | F04B 41/02 |
| | | | | 417/423.15 |
| 10,427,724 B2 | 10/2019 | Line | | |
| 10,436,386 B2 | 10/2019 | Heon | | |
| 2010/0269919 A1* | 10/2010 | Stopka | ................... | F04B 35/06 |
| | | | | 137/376 |
| 2023/0250837 A1* | 8/2023 | Oishi | ........................ | F15B 1/04 |
| | | | | 248/632 |

\* cited by examiner

MOUNTING BRACKET FOR AN AIR TANK SYSTEM

CROSS-REFERENCE TO RELATED APPLICATIONS

The present application claims the benefit of U.S. Provisional Application Ser. No. 63/267,689, filed on 2022 Feb. 8, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to components for an air tank system.

The air tank/pressure vessel of an air tank system may be connected to at least one air compressor and a manifold valve. These components are usually placed next to the air tank and take extra space when placing the air tank system in a compact area, such as inside of an automobile.

Accordingly, there is a need in the art for an improved method and device for mounting components, such as an air compressor and manifold valve, to the air tank and address other deficiencies.

BRIEF SUMMARY

The various embodiments and aspects disclosed herein address the needs discussed above, discussed below and those that are known in the art.

An air tank system having mounting brackets attached to an air tank/pressure vessel is disclosed. The air tank/pressure vessel may have a plurality of external rods orientated longitudinally along the outer surface of the air tank and connected to the end caps of the air tank. The plurality of external rods is configured to have mounting brackets attached to them to have components such as an air compressor and a manifold valve attached to the exterior of the air tank. The mounting bracket may comprise two members that are slidable across the external rods and configured to adjust a length distance between the bolt holes of each member. As a result, the mounting bracket may accommodate the different sizes of air compressors and manifold valves to be mounted on the air tank. A separate plate may also be used to adjust a width distance between the bolt holes to further accommodate the different sizes of the air compressors and manifold valves. Hence, the mounting bracket kit may provide a universal mounting mechanism for various components to be mounted on the air tank.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
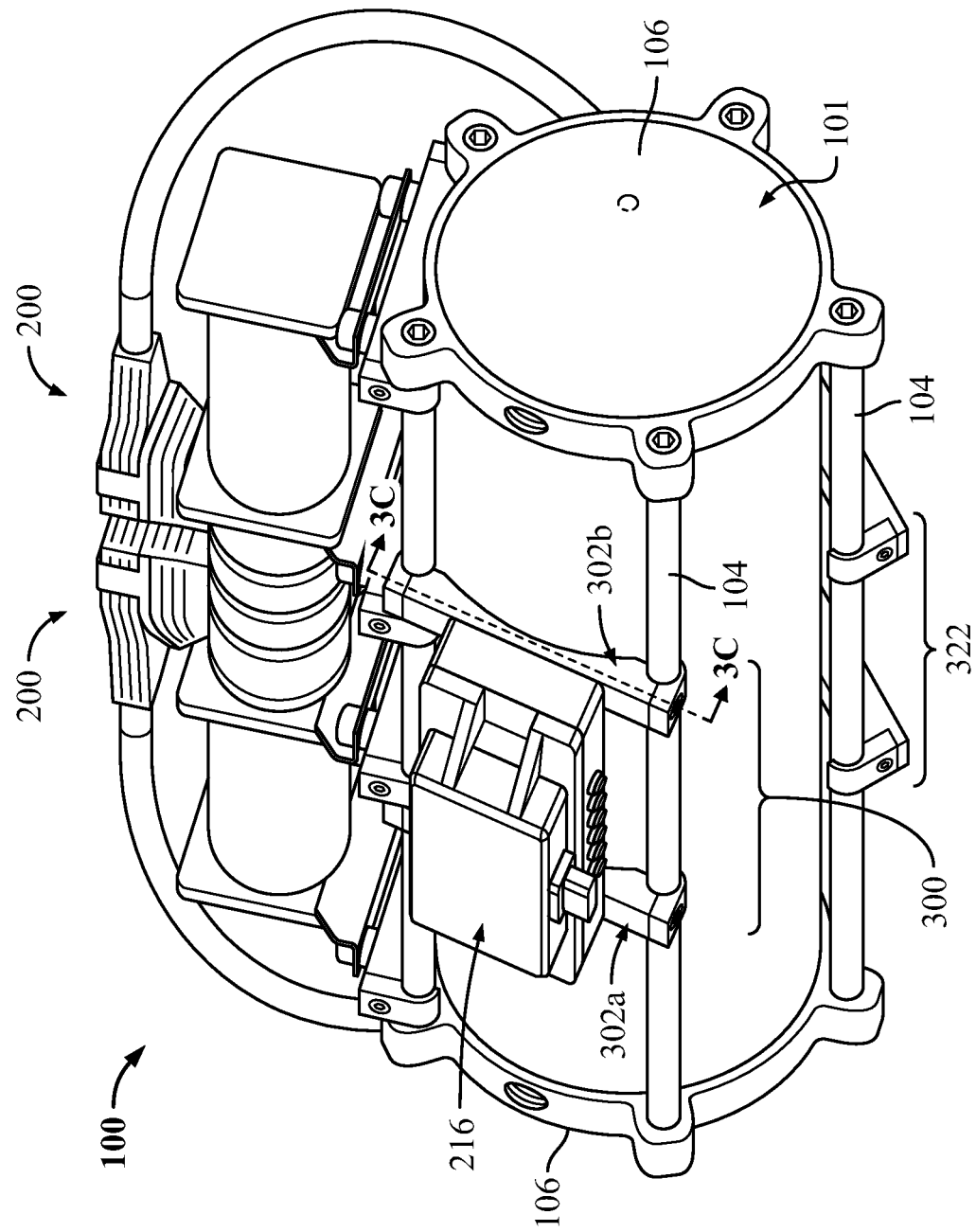
FIG. 1A is a perspective view of an air tank system.

Referring now to FIG. 1A, a perspective view of an air tank system 100 is shown. The air tank system 100 comprises an air tank/pressure vessel 101 having a plurality of external rods 104 orientated longitudinally along the outside surface of the air tank 101 and connected to the end caps 106 of the air tank 101. The plurality of external rods 104 are configured to have mounting brackets 300 attached to them to have components, such as an air compressor 200 and a manifold valve 216, attached to the exterior of the air tank 100. The mounting bracket 300 may comprise of mounting members 302a, b that can slide along the external rods 104 independently from each other. As a result, the space between the mounting members 302a, b may be adjusted to allow for air compressors 200 and manifold valves 216 of different sizes to be mounted on the air tank 101. As shown in FIGS. 1A and 3C, if a width distance 334 (see FIG. 3C) between the bolt holes of the mounting members 302a, b does not match a width 210 of the bolt pattern 204 (see FIG. 2C) of the component (e.g., air compressor 200 or manifold valve 216), interface plates 336 (see FIGS. 3E-F) may be used. In this way, the component may be mounted to the exterior of the air tank 100 regardless of the width of the bolt pattern 204 of the component. The air tank system 100 may also comprise mounting legs 322 to provide foundational support when placing the air tank system 100 horizontally or vertically inside an automobile.

Figure 1B:
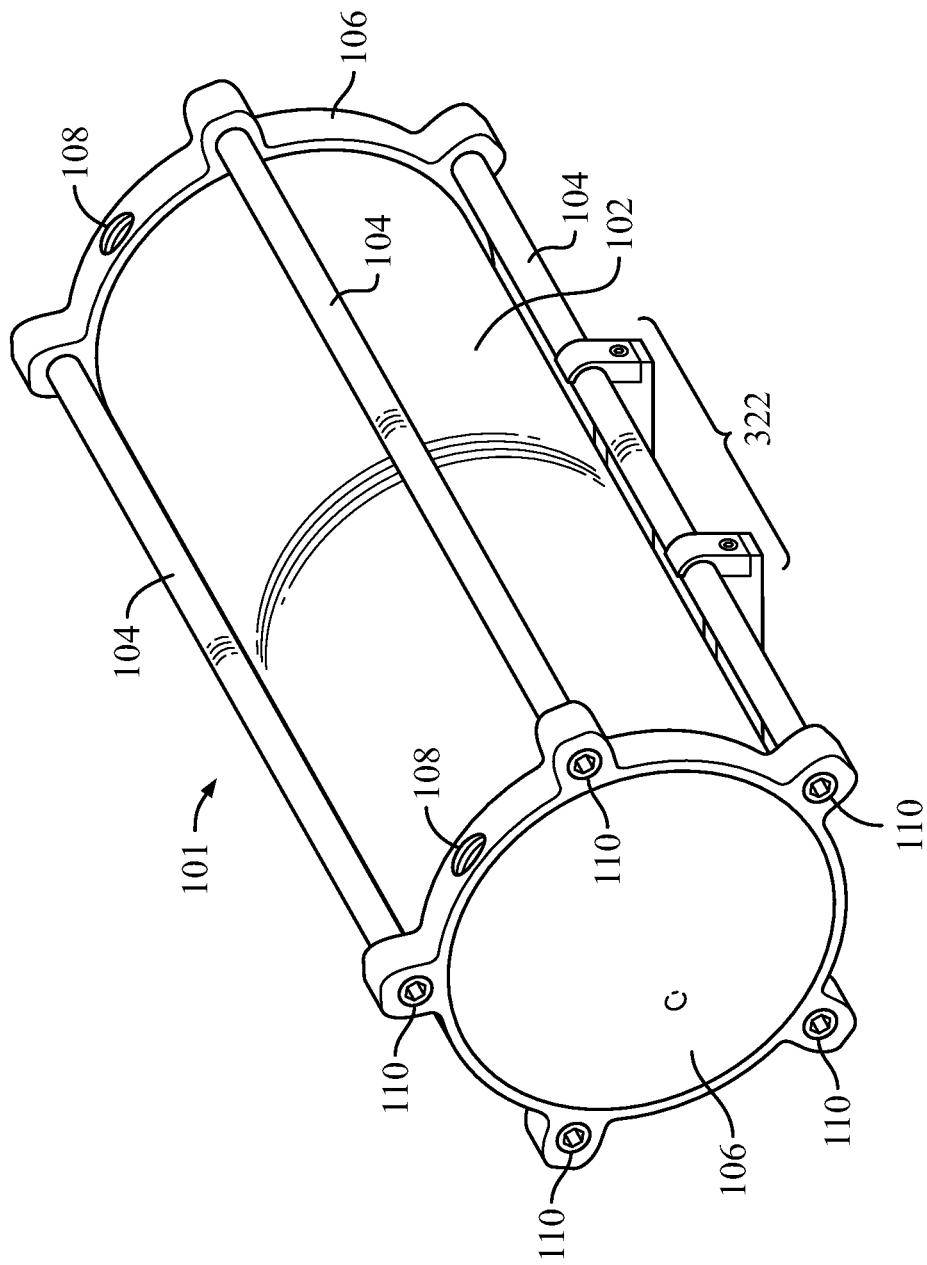
FIG. 1B is a perspective view of an air tank/pressure vessel.

Referring now to FIG. 1B, a perspective view of an air tank/pressure vessel 101 is shown. The main components of the air tank 101 are the body 102, the end caps 106 located at the opposite ends of the body 102, and the external rods 104 that bind the end caps 106 and the body 102 together. By way of example and not limitation, the end caps 106 may also contain end ports 108 for fluid communication between the interior of the body 102 and an air compressor system, a manifold valve, or the ambient atmosphere.

The body 102 of the air tank/pressure vessel 101 may have any shape. By way of example and not limitation, the body 102 may have a tube shape that is hollow. The end caps 106 may attach and cover the first end and the second end of the body 102 of the air tank 101 to create an enclosure for holding the pressurized gas in the interior of the body 102. The shape of the end caps 106 may be circular, hemispherical, square, or a disk shape. The end caps 106 may contain end ports 108 to create fluid communication between the interior of the air tank 101 and an air compressor system, a manifold valve, or the ambient atmosphere. The end ports 108 may be a combination of inlet ports and outlet/drain ports. There may be a single or a plurality of inlet ports on each end caps 106 ranging from one to four inlet ports. There may be a single or a plurality of drain ports on each end caps 106 ranging between one to two drain ports.

The external/connecting rods 104 may be used to secure and bind the end caps 106 to each other and to the body 102 of the air tank 101 to create an airtight enclosure for storing pressurized air. The external rods 104 may run along the longitudinal length of the body 102 and fasten the end caps 106 to the first end and second end of the body 102. Each end cap 106 may have fastening holes 110 for the external rods 104 to fit inside and tighten the end caps to the body 102. By way of example and not limitation, the fastening holes 110 may be threaded for the ends of the external rods 104 to fasten with the fastening holes 110. Alternatively, the end caps 106 may already be fastened to the ends of the body 102 and the external rods 104 are attached to the end caps 106 and run along the body 102 for other purposes as described elsewhere herein.

There may exist a plurality of external rods 104 along the exterior surface of the air tank 101. By way of example and not limitation, there may exist between four to six external rods 104 on the exterior surface of the air tank. The external rods 104 may be symmetrically spaced apart from each other. By way of example and not limitation, there may exist five external rods 104 symmetrically spaced apart from each other. The external rods 104 may be gapped away from the body 102 and the exterior surface of the air tank 101. Alternatively, the external rods 104 may contact the body 102 and the exterior surface of the air tank 101. As described elsewhere herein, the external rods 104 may serve as mounting rails for the mounting bracket kit and mounting legs 322.

The external rods 104 may be cylindrical shaped. The material that the external rods 104 are made from may be of a steel alloy, such as carbon steel. The material for manufacturing the external rods 104 may come in billet form. The external rods 104 may also be coated with a corrosion resistant coating. By way of example and not limitation, the exterior surface of the external rods 104 may be chrome or nickel plated to add corrosion resistance in addition to other benefits. The chrome plating may be hard chrome plating.

The air tank 101 may have the necessary volumetric dimensions to fit inside an automobile, particularly the trunk of the automobile. By way of example and not limitation, the cylindrical length of the air tank 101 may be between 20 to 36 inches. The diameter of the air tank 101 may be between 8 to 20 inches. By way of example and not limitation, the volumetric capacity of the air tank 101 may be between 2.5 to 5 gallons. The maximum pressure that the air tank 101 can hold may be between 200 to 250 psi. The air tank 101 may be corrosion resistant, dust resistant, and moisture resistant. The air tank may also be orientated horizontally or vertically inside the automobile by the way of the mounting legs 322.

Figure 2A:
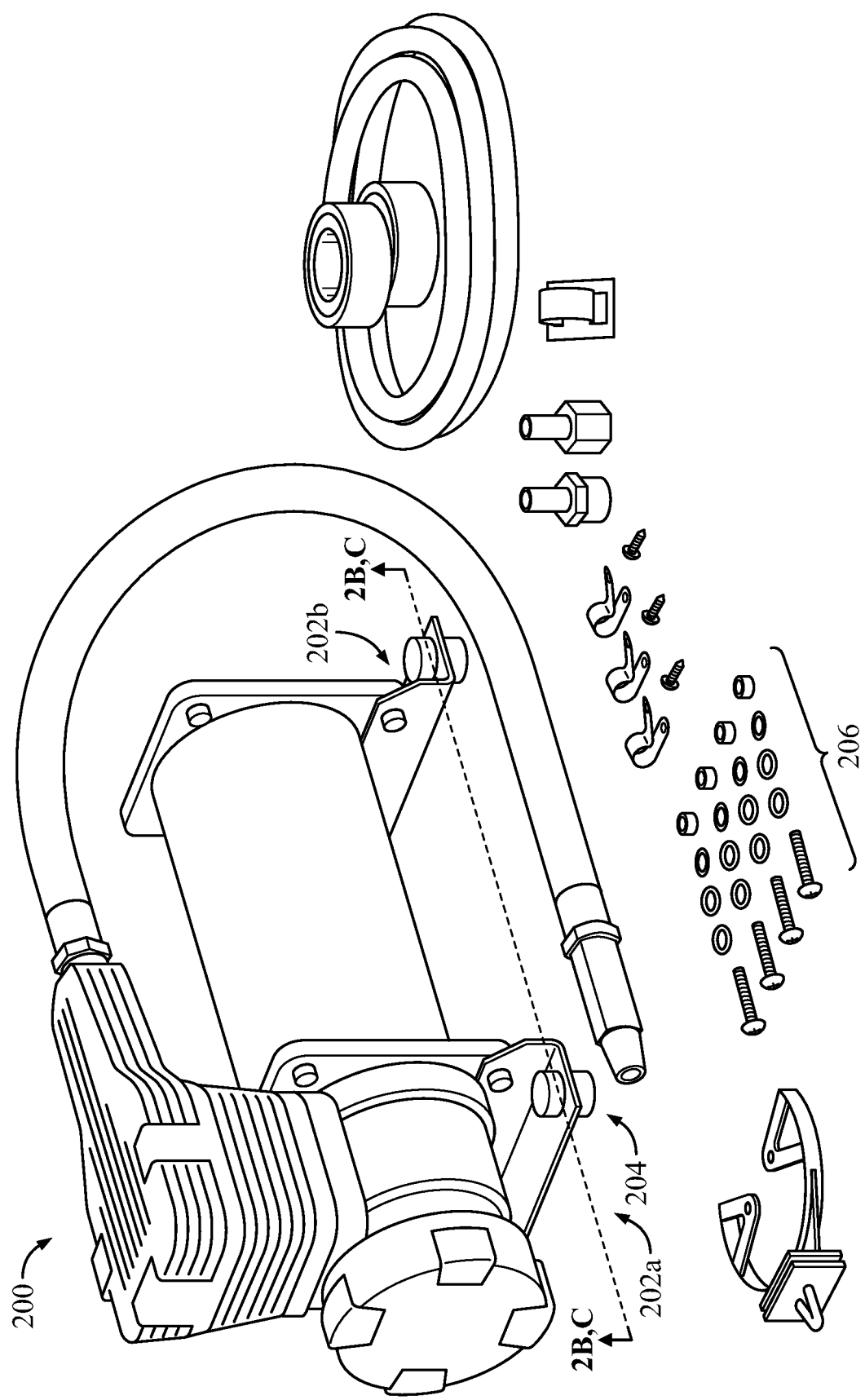
FIG. 2A is a perspective view of an air compressor.

Referring now to FIG. 2A, a perspective view of an air compressor 200 is shown. The mounting brackets described elsewhere herein are designed to attach various brands of air compressors 200 to the air tank 101. By way of example and not limitation, the air compressor designed for the 200 PSI Continuous Duty Onboard Air System (Part No. 2002) sold under the trademark name of VIAR is referenced herein.

The air compressor 200 comprises a compressor tank connected to a motor and a pump. A mounting mechanism may be incorporated with the air compressor 200. The mounting mechanism may comprise a plurality of mounting supports 202a, b having bolt patterns 204 and fastening elements 206 to fasten the air compressor 200 to the mounting brackets. The fastening elements 206 may comprise a plurality of mounting bolts and nuts. Flat washers and locking washers may be incorporated between the mounting bolts and nuts to provide a better fastening.

Figure 2B:
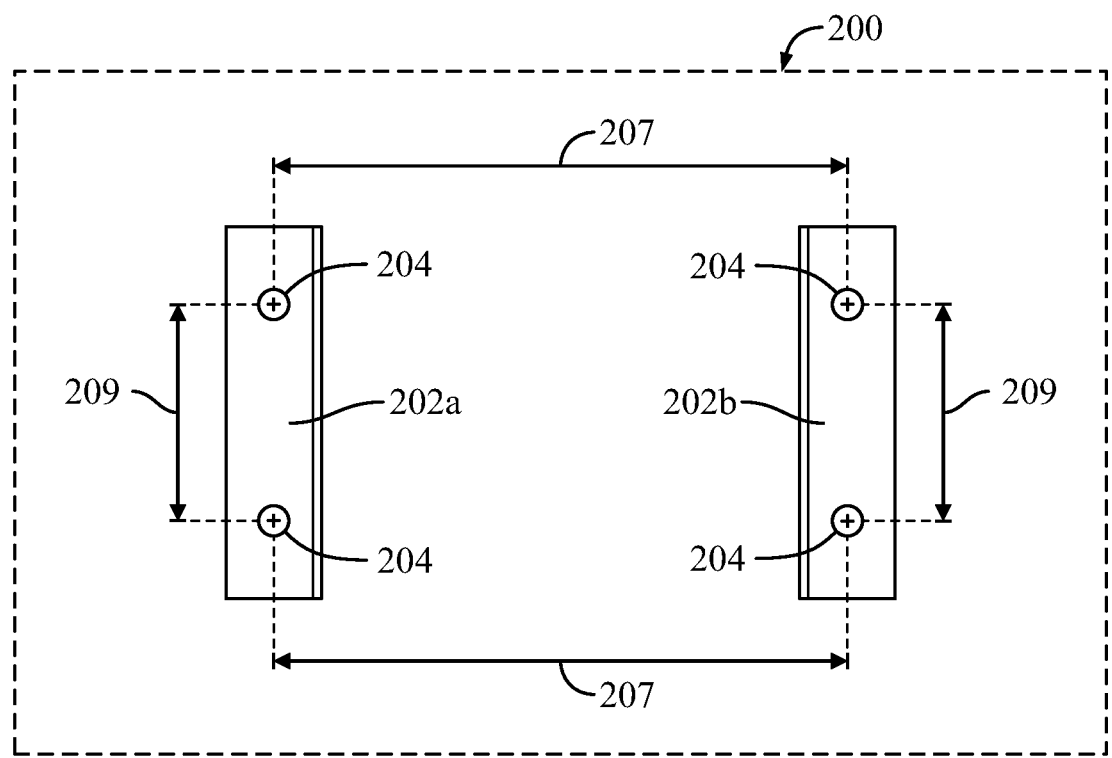
FIG. 2B is a bottom view of mounting supports detached from the air compressor.
Figure 2C:
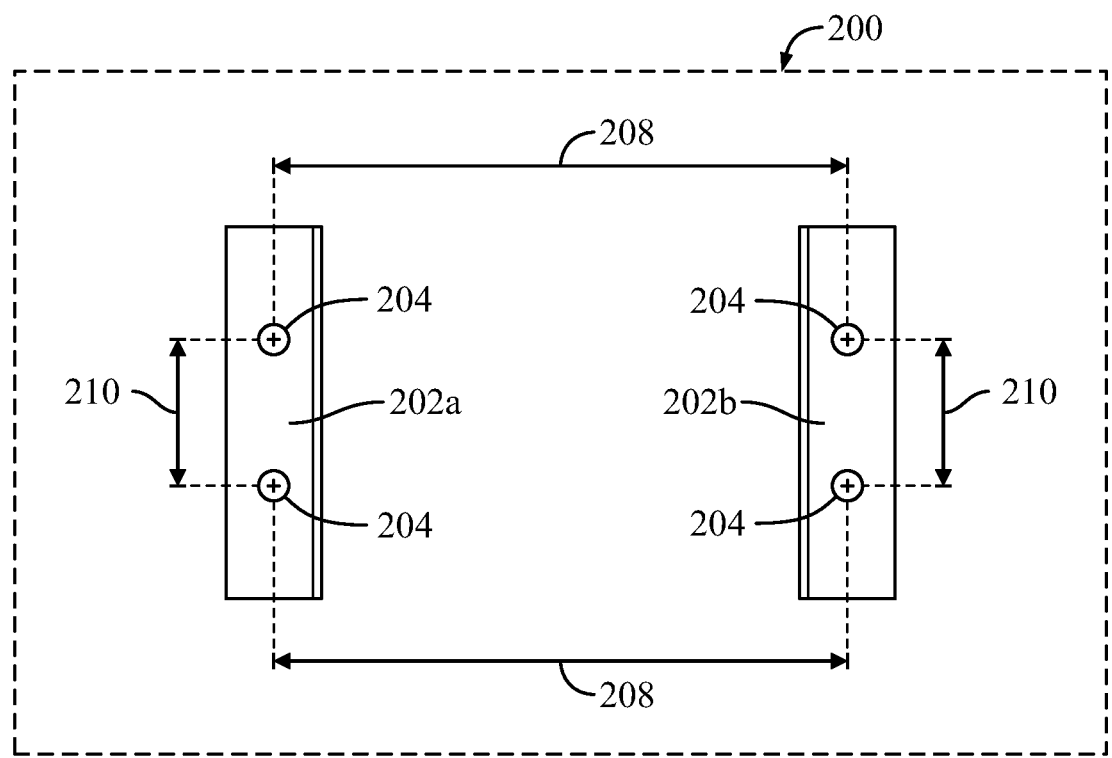
FIG. 2C is a bottom view of mounting supports detached from the air compressor in an alternative example.

Referring now to FIG. 2B, a bottom view of the mounting supports 202a, b detached from the air compressor 200 is shown. By way of example and not limitation, there may be two mounting supports 202a, b attached on the opposite sides of the air compressor 200. Each mounting support 202a, b may have a plurality of bolt holes making up a bolt pattern 204. The mounting support distance 207 may be measured from the center of the bolt holes of one mounting support 202a to the center of the bolt holes of the second mounting support 202b. As described elsewhere herein, the mounting bracket may be adjusted relative to the mounting support distance 208 to align with the bolt patterns 204 and fasten the air compressor 200 to the air tank 101 of FIG. 1B. Instead of a plurality of mounting supports 202a, b, it is also contemplated that the mounting support may be one component that has all the bolt patterns 204 and is attached to the air compressor.

By way of example and not limitation, the bolt pattern 204 of each mounting support 202a, b may have two bolt holes. It is also contemplated that the bolt pattern 204 of each mounting support 202a, b to have more bolt holes, such as between three to eight bolt holes. The bolt pattern width 209 may align with the bolt holes of the mounting bracket to fasten the air compressor 200 to the air tank 101 of FIG. 1B. The bolt pattern width 209 between the bolt holes may be measured from the center of one bolt hole to a center of a second bolt hole, as shown in FIG. 2B. As shown in FIG. 3C, the length distance 332 of the mounting bracket 300 may be adjusted to substantially equal the mounting support distance 207 of the air compressor 200 in FIG. 2B so that the bolt hole pattern 306 aligns with the bolt pattern 204. The mounting members 302a, b are slid, as discussed herein, on the external rods to adjust the distance 332 between the mounting members 302a, b of the mounting bracket 300. In this example, the width distance 334 is substantially equal the bolt pattern width 209. As a result, the air compressor 200, or other components, may directly be mounted to the mounting bracket 300. As shown in FIGS. 2C and 3C, if the bolt pattern width 210 does not align with the width distance 334, then interface plates 336 shown in FIGS. 3E and 3F may be used to mount the component to the mounting bracket 300. As shown in FIG. 2C, the mounting support distance 208 of the air compressor 200 may also not completely align with the length distance 332 of the mounting bracket 300 of FIG. 3C, which an interface plate may also be used for this reason.

Figure 2D:
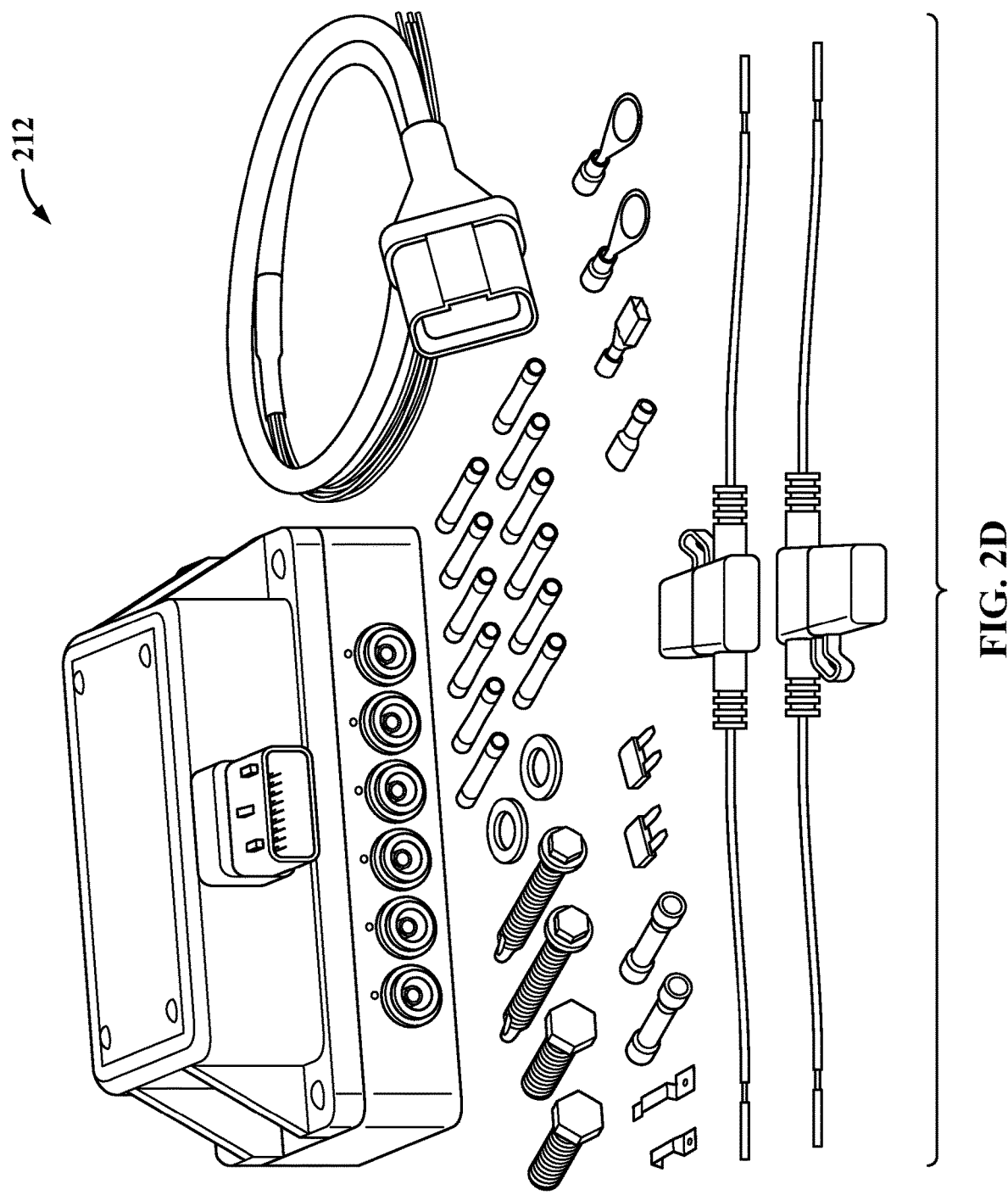
FIG. 2D is a perspective view of a manifold valve.

Referring now to FIG. 2D, a perspective view of a manifold valve 212 is shown. The mounting brackets described elsewhere herein are configured to attach various brands of manifold valves 212 to the air tank 101 of FIG. 1B. The mounting bracket may be adjusted to align with the fastening surface of the manifold valve 216 to fasten the component to the exterior of the air tank 101. By way of example and not limitation, the 3S ⅜" Manifold For Use With Switch Box sold under the trademark AIR LIFT PERFORMANCE is referenced herein. The manifold valve 212 may be designed for use with a controller to raise or lower the suspensions of an automobile.

Figure 3A:
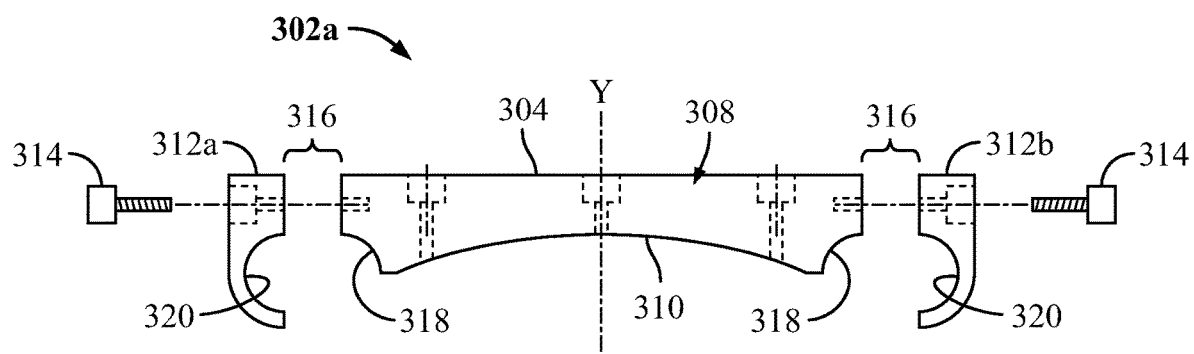
FIG. 3A is an exploded front-view of a mounting member of a mounting bracket.
Figure 3B:
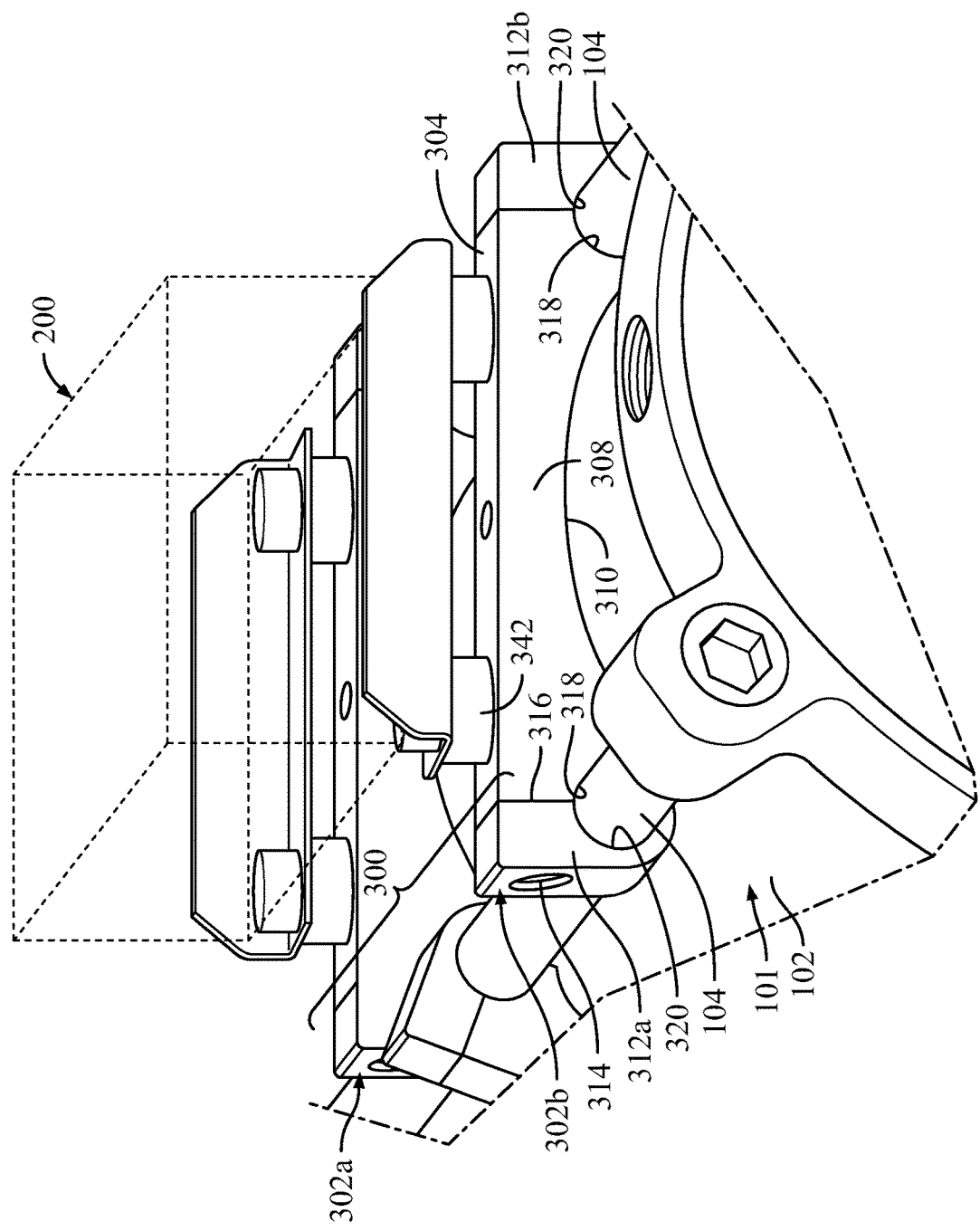
FIG. 3B is a close-up view of the mounting bracket attach to the air tank.
Figure 3C:
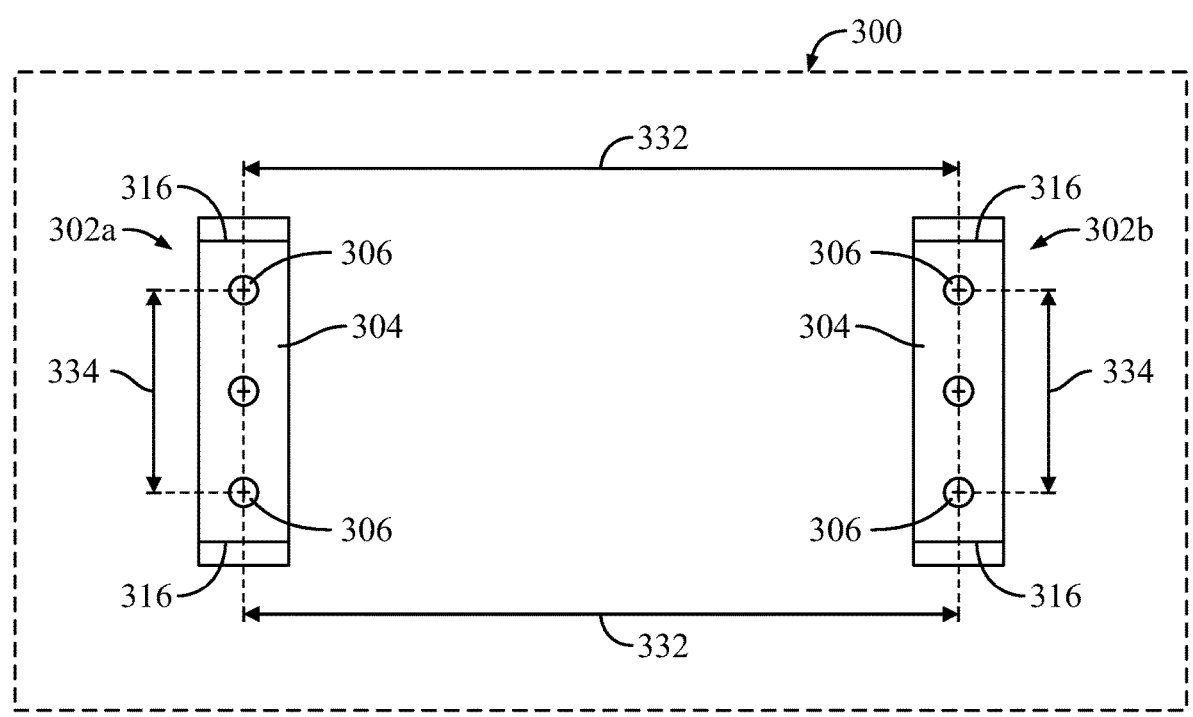
FIG. 3C is a top view of the mounting members of the mounting bracket.

Referring now to FIGS. 3A and 3B, an exploded front-view of a mounting member 302a and a close-up view of the mounting bracket 300 attached to the external rods 104 are shown. As shown in FIG. 3B, the mounting bracket 300 may have at least two mounting members 302a, b that are each attached and adjustable across a pair of external rods 104 on the air tank 101. The two mounting members 302a, b may contact or be spaced away from the air tank 101 and may be configured to adjust by sliding independently from each other across the external rods 104. As shown in FIG. 3C, such adjustment would change the length distance 332 between the bolt hole patterns 306 of the mounting members 302a, b. As a result, the mounting bracket 300 may be adjusted for the different sizes of the components that need to be mounted on the air tank 101.

With reference to FIG. 3A, a mounting member 302a may have a main body portion 308 and two sliding sections 312a, b. The main body portion 308 is located between the sliding sections 312a, b and is where the mounting surface 304 for fastening components to the mounting member 302a is located. The sliding sections 312a, b are mostly responsible for the adjusting and tightening of the mounting member 302a along the external rods 104. The mounting member 302a shown in FIG. 3A may be the same as the second mounting member 302b shown in FIG. 3B.

By way of example and not limitation, the main body portion 308 may generally be rectangular. The upper surface of the main body portion 308 may have the mounting surface 304 with the bolt hole pattern 306 shown in FIG. 3C. The mounting surface 304 may be used for the fastening of a component to the mounting member 302a, b as described elsewhere herein. By way of example and not limitation, dampened rubber rings 342 (see FIGS. 3G and 3B) may also be incorporated between the bolt hole pattern 306 and the bolt pattern 204 (see FIG. 2B) when fastening the component to the mounting member 302a, b.

With further reference to FIG. 3B, the bottom surface 310 of the main body portion 308 may either be spaced away or contact the air tank 101 and have an arc shape to form around the outer curvature of the body 102. As seen in FIG. 3A, the sides or bottom edges 318 of the main body portion 308 may be concave. The bottom edges 318 may be rounded around the contours of the external rods 104 that contact the mounting members 302a, b to help create a sliding enclosure. The sliding enclosure helps to adjust and slide the mounting member 302a, b along the external rods 104. The sides or bottom edges 318 may only cover an arc length of the of the external rods 104. By way of example and not limitation, the bottom edges 318 may each cover less than or equal to ¼ of the circumference of the circular cross-section of the external rod 104.

By way of example and not limitation, the main body portion 308 may have a hollow interior where the nuts and bolts that fasten the component to the mounting surface 304 can be tightened together. The bolts may penetrate inside the hollow interior through the bolt hole pattern 306 (see FIG. 3C) of the main body portion 308, where a user can access the interior from a bottom, rear, or side surface to fasten the bolt. Alternatively, the main body portion 308 may have a solid interior, where the bolt hole pattern 306 may be threaded holes inside the main body portion 308.

Figure 3D:
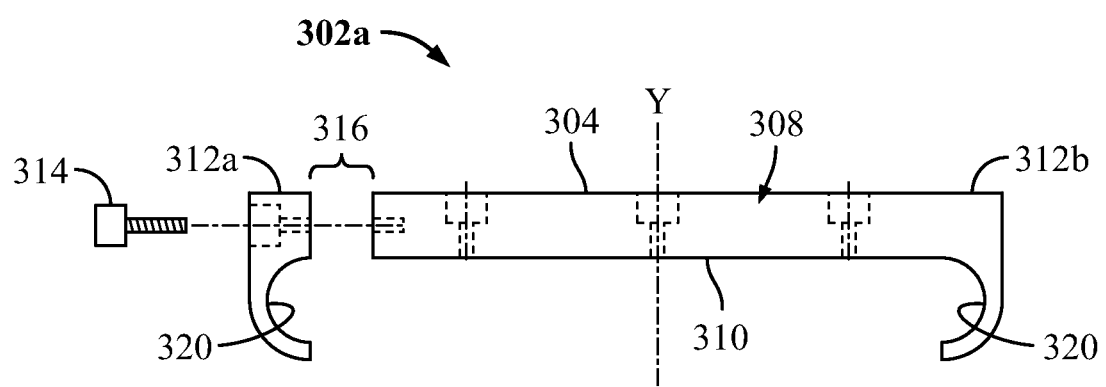
FIG. 3D is an exploded front-view of another example of a mounting member.

As seen in FIG. 3A, the two sliding sections 312a, b may adjoin next to the sides of the main body portion 308 as separate parts. Gaps 316 may exist between the sliding sections 312a, b and the main body portion 308. The sliding sections 312a, b may be tightened and loosened by bracket tighteners 314 (i.e., fasteners). As a result, the mounting member 302a may be fixed or slide/adjust along the external rods 104 shown in FIG. 3B. With further reference to FIG. 3D, one of the sliding sections 312b may be integrated with the main body portion 308, where the sliding section 312b and the main body portion 308 are one part. In this example, the other sliding section 312a would be the component used for fixing the mounting member 302a along the external rods 104. The gap 316 between the sliding section 312a and the main body portion 308 may be tightened and loosened by a bracket tightener 314.

The sliding sections 312a, b may have concave inner surfaces 320. As shown in FIG. 3B, the inner surfaces 320 may be rounded around the contours of the external rods 104 that help create sliding enclosures for the adjusting and sliding of the mounting member 302a, b across the external rods 104. The rounded inner surfaces 320 may only cover an arc length of the external rods 104. By way of example and not limitation, the rounded inner surfaces 320 may each cover less than or equal to ½ of the circumference of the circular cross-section of the external rod 104. The outside edges of the sliding sections 312a, b may be rounded or rectangular or a combination thereof. By way of example and not limitation, the outside edges of the sliding sections 312a, b nearest to the external rods 104 may be rounded and the outside edges nearest to the mounting surface 304 may be rectangular.

The tightening gap 316 between the sliding section 312a, b and the main body portion 308 may be tightened and loosened by a bracket tightener 314 for fixing or sliding the mounting member 302a, b to a desired location on the external rods 104. The bracket tightener 314 may be located on a side surface of the sliding section 312a, b. As seen in FIG. 3A, and by way of example and not limitation, the bracket tightener 314 may be a threaded bolt or screw that fastens and unfastens the sliding section 312a, b to the main body portion 308 through a threaded hole penetrating the two parts.

With reference to FIG. 3C, each mounting member 302a, b may have a mounting surface 304 with a bolt hole pattern 306. By way of example and not limitation, a bolt hole pattern 306 may have between two to eight bolt holes. The bolt hole pattern 306 on each mounting surface 304 may align and connect to the bolt pattern 204 of a component (see FIG. 2B). By way of example and not limitation, the length distance 332 between the mounting members 302a, b may be adjusted to match the mounting support distance 207 of the component (see FIG. 2B). When the width distance 334 is substantially the same as the bolt pattern width 209, the bolt hole pattern 306 may align with the bolt pattern 204 and the component may be fastened to the mounting bracket 300. The length distance 332 between the two mounting members 302a, b may be measured from the center of the bolt holes of one mounting member 302a to the center of the bolt holes of the second mounting member 302b. Mounting components, such as an air compressor and a manifold valve, are contemplated to be mounted to the mounting bracket 300. Fastening elements mentioned elsewhere herein may be used for the fastening of the mounting component to the mounting surfaces 304 of the mounting bracket 300.

Figure 3E:
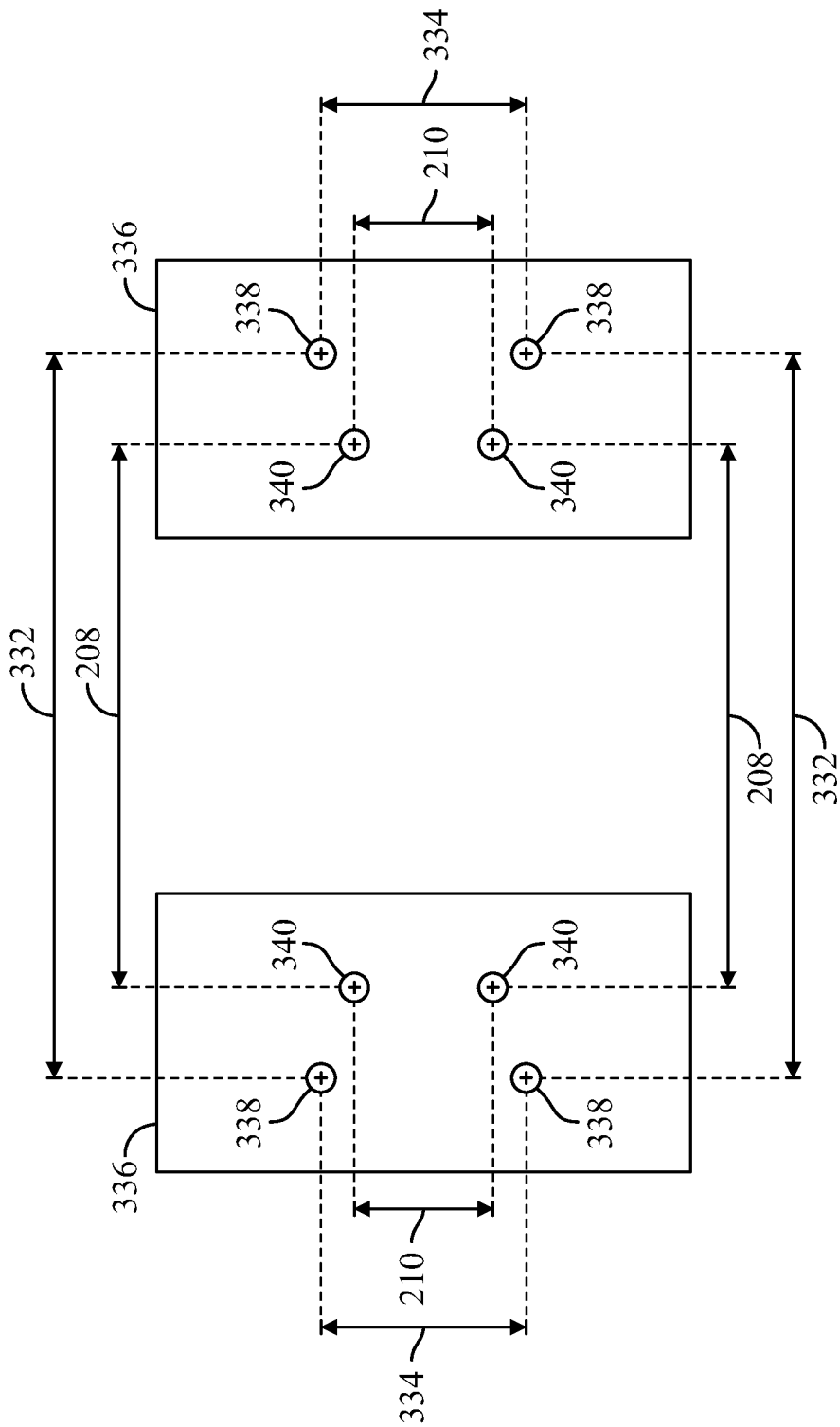
FIG. 3E is a top view of interface plates.
Figure 3F:
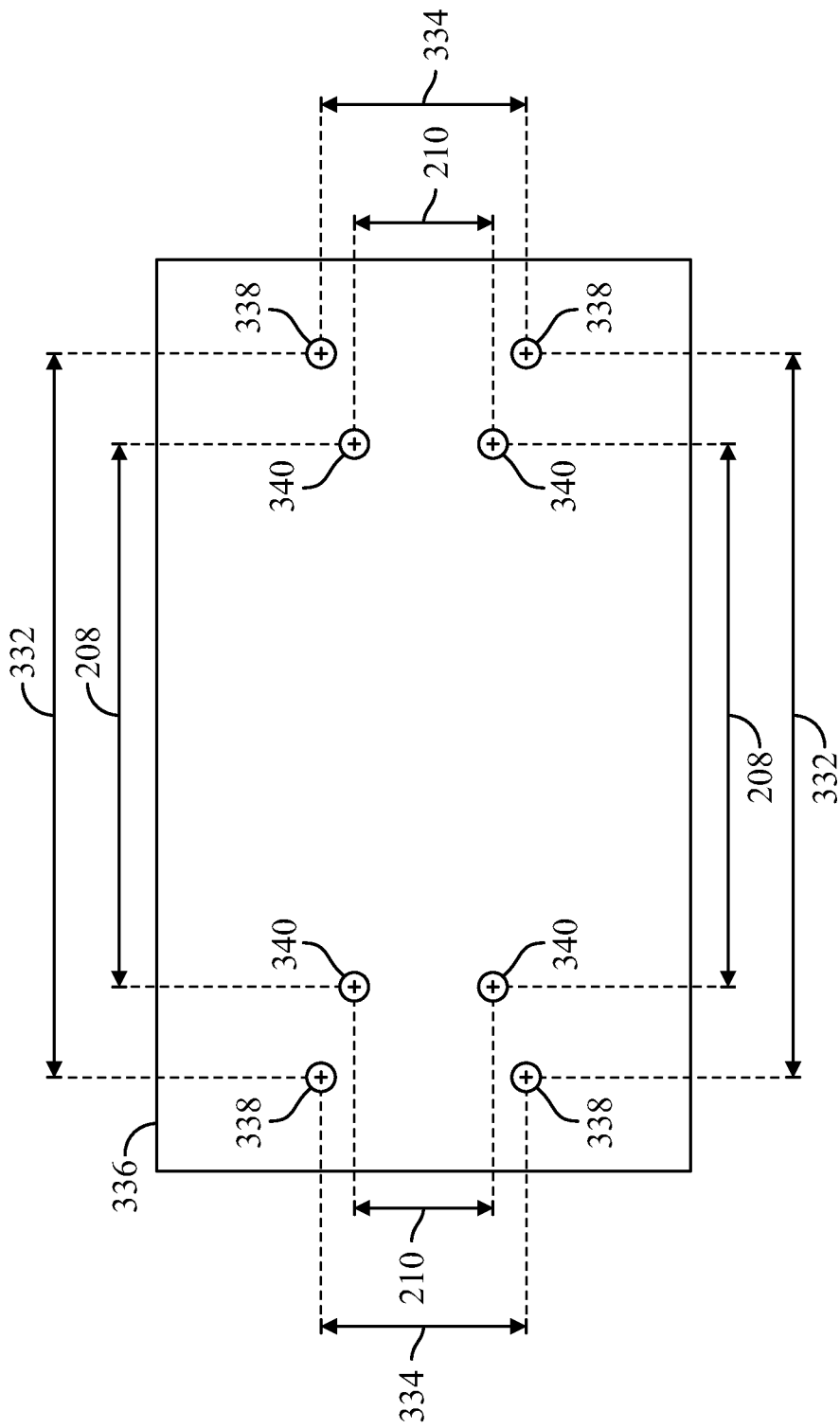
FIG. 3F is a top view of another example of an interface plate.
Figure 3G:
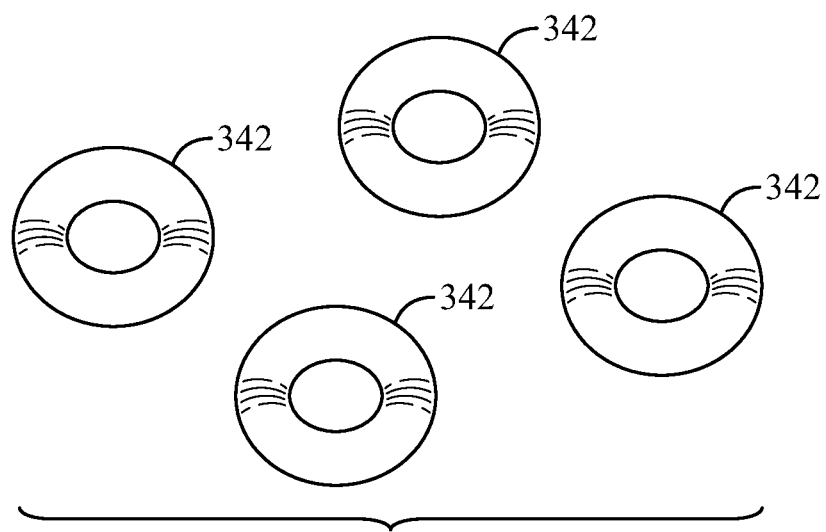
FIG. 3G is a top view of dampened rubber rings for the mounting members.

Referring now to FIG. 3E, a top view of interface plates 336 are shown. If a component such as an air compressor has bolt patterns 204 (see FIG. 2C) that cannot align with or is a different size than the bolt hole patterns 306 (see FIG. 3C) of the mounting members 302a, b, then interfaces plates 336 may be used in between the mounting members 302a, b and the component. There may be two interface plates 336 that attach separately to each mounting member 302a, b, or there may be a single interface plate 336 (see FIG. 3F) that attaches to both mounting members 302a, b.

With further reference to FIGS. 3C and 2C, and by way of example and not limitation, interface plates 336 may be used because the bolt pattern width 210 of the mounting supports 202a, b may not align with the width distance 334 of the mounting members 302a, b. The width distance 334 between the bolt holes may be measured from the center of one bolt hole to a center of a second bolt hole on the same mounting member 302a, b, as shown in FIG. 3C. By way of example and not limitation, another reason why interface plates may be used is because the mounting support distance 208 of the air compressor 200 may also not completely align with the length distance 332 of the mounting bracket 300. By way of example and not limitation, another reason why interface plates 336 may be used is because the bolt holes of the mounting supports 202a, b may have different diameters than the bolt holes of the mounting members 302a, b.

The interface plate 336 (see FIG. 3E) may have a first set of fastening holes 338 and a second sets of fastening holes 340. The first set of fastening holes 338 align with the bolt holes of the bolt hole patterns 306 shown in FIG. 3C. The first set of fastening holes 338 may align by having the same length distance 332 and width distance 334 as the bolt hole patterns 306. The second set of fastening holes 340 align with the bolt pattern 204 shown in FIG. 2C. The second set of fastening holes 340 may align by having the same mounting support distance 208 and bolt pattern width 210 as the bolt pattern 204. As a result of the interface plates 336 matching and aligning with the bolt hole pattern 306 and the bolt pattern 204, the component may be mounted to the mounting bracket 300. By way of example and not limitation, the second set of fastening holes 338 may be manually drilled in the interface plate 336 for more customizable freedom for the user. The first set of fastening holes 338 may also be manually drilled.

Figure 4A:
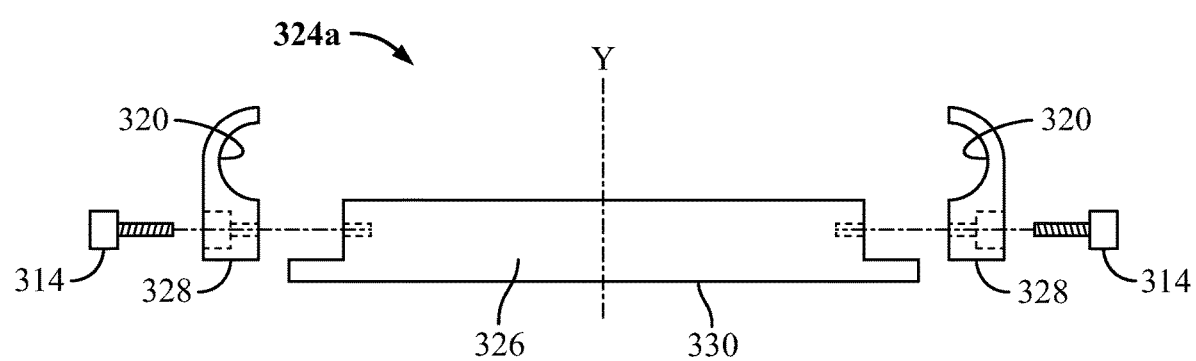
FIG. 4A is an exploded front-view of a mounting leg member.
Figure 4B:
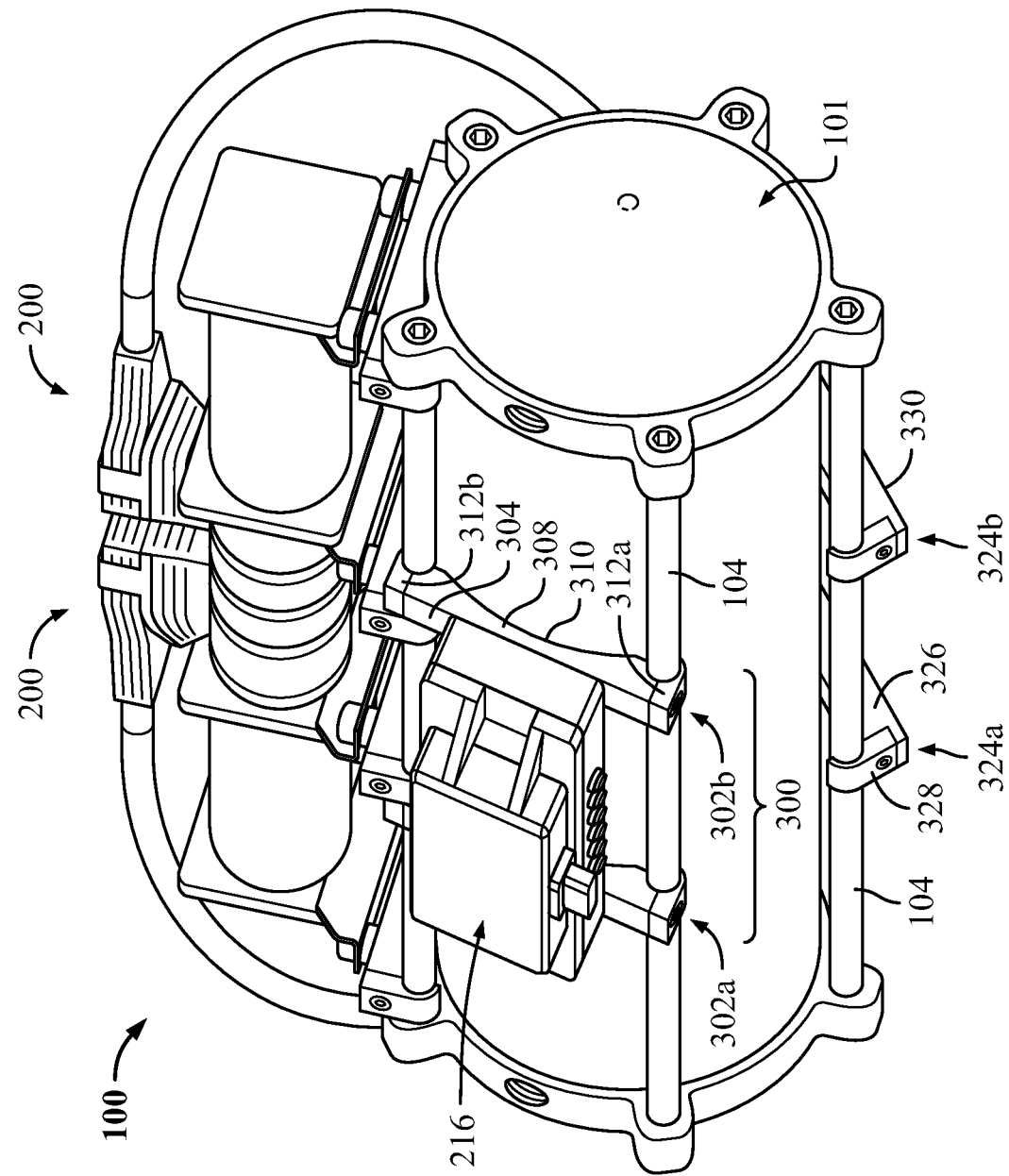
FIG. 4B is a perspective view of mounting legs attached to the air tank.

Referring now to FIGS. 4A and 4B, an exploded front-view of a mounting leg member 324a and a perspective view of mounting legs 322 attached to a pair of external rods 104 of an air tank 101 are shown. The mounting legs 322 provide a stable foundation when placing the air tank system 100 horizontally or vertically on the ground or inside an automobile. With the exception of the mounting surfaces 304 and the bolt hole patterns 306 of the mounting bracket 300, the mounting legs 322 may have similar features as the mounting bracket 300 described elsewhere herein.

Figure 4C:
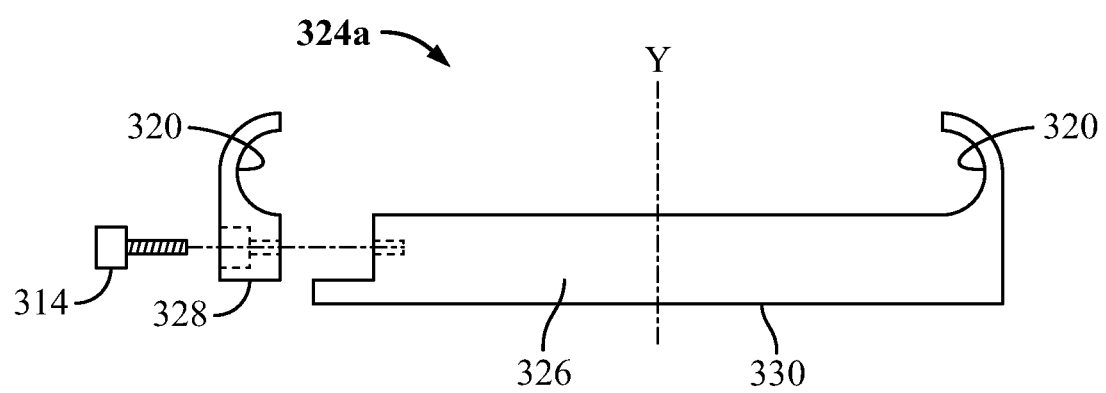
FIG. 4C is an exploded front-view of another example of a mounting leg member.

As seen in FIG. 4B, the mounting legs 322 may have two mounting leg members 324a, b that may be adjusted to slide along the external rods 104 independently from each other. As seen in FIG. 4A, each mounting leg member 324a, b may have a main body portion 326 and two sliding sections 328, where each sliding section 328 may be on the two outer sides of the main body portion 326. As shown in FIG. 4C, and by way of example and not limitation, one of the sliding sections 328 of the mounting leg member 324a may be integrated and one part with the main body portion 326 of the mounting leg member 324a. The sliding sections 328 of the mounting leg member 324a, b may be similar to the sliding sections 312a, b of the mounting members 302a, b and have the same tightening mechanism described elsewhere herein. The main body portion 326 of the mounting leg member 324a, b may also be similar to the main body portion 308 of the mounting members 302a, b described elsewhere herein.

However, the main body portion of the mounting leg member 324a, b may have a foundation surface 330 instead of a mounting surface 304. The foundation surface 330 may be configured to contact the ground. By way of example and not limitation, the foundation surface 330 may extend and cover the surfaces of the mounting leg sliding sections 328 that would contact the ground. The foundation surface 330 may also have a rough surface area to increase the friction between the ground and the mounting leg member 324a, b.

Figure 5A:
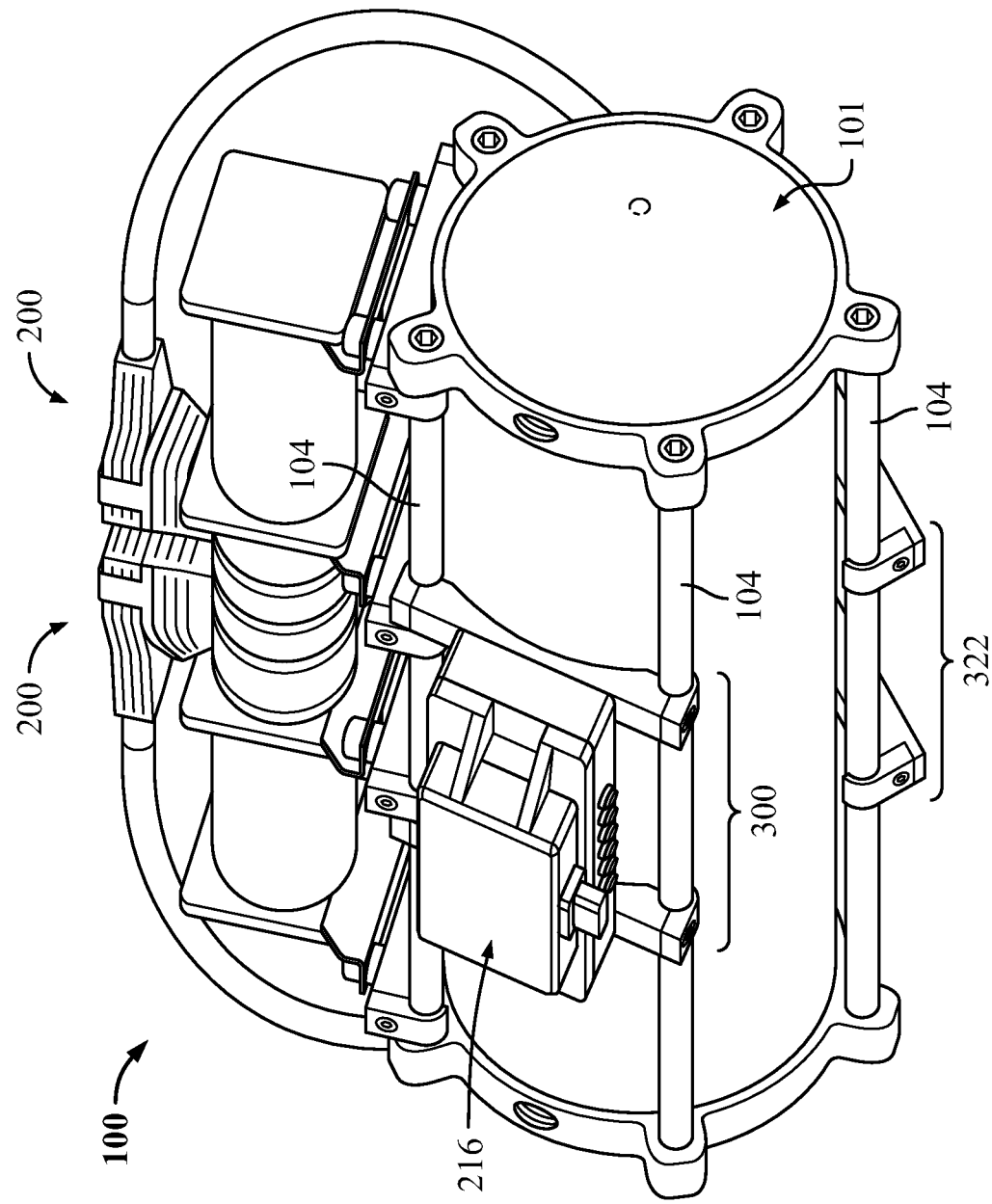
FIG. 5A is a perspective view of an air tank system with a plurality of components mounted on the air tank.
Figure 5B:
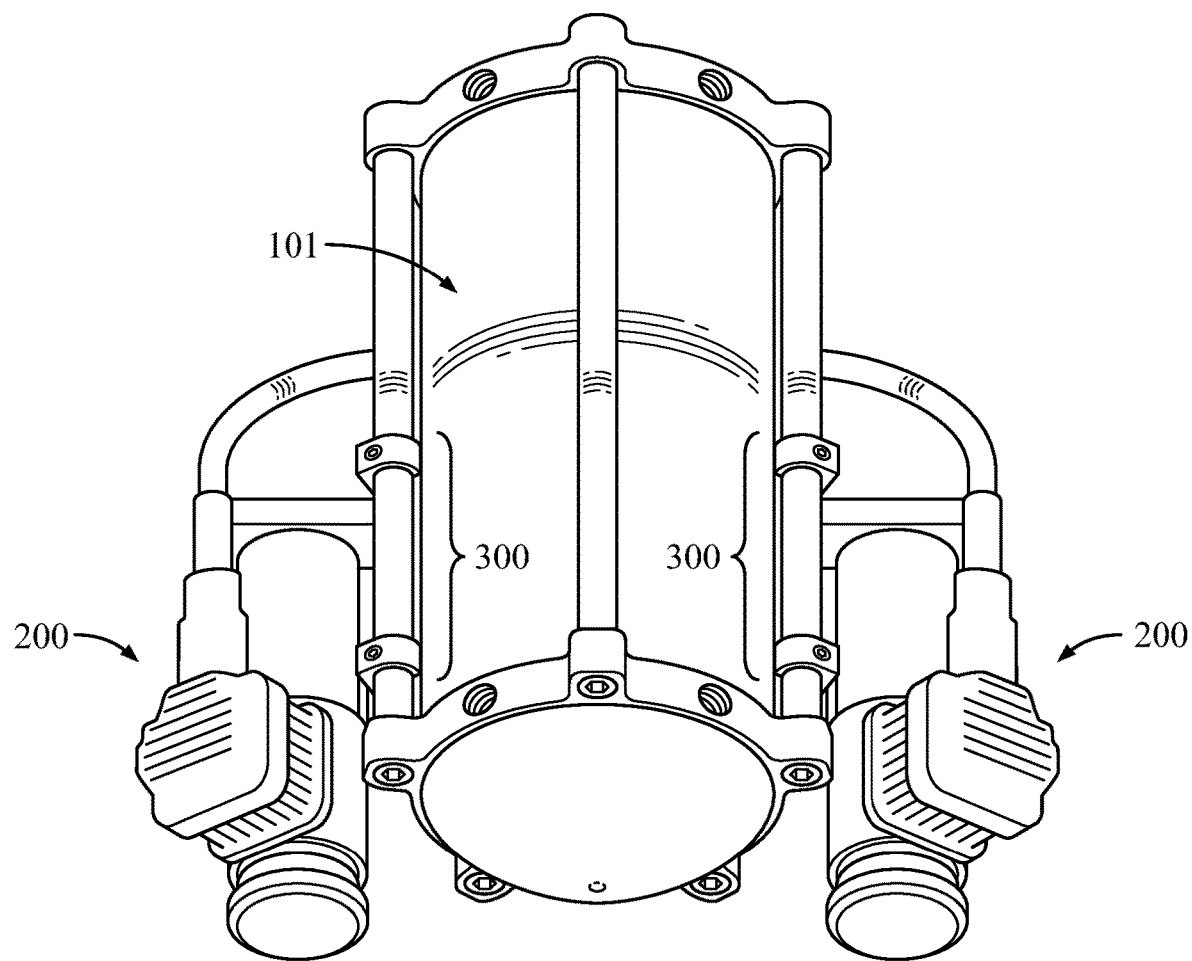
FIG. 5B is a front top-view of an air tank system with a plurality of components mounted to the air tank.

Referring now to FIGS. 5A and 5B, a perspective view and a front-top view of an air tank system 100 with a plurality of components mounted on the air tank is shown. By way of example and not limitation, the air tank 101 may have a plurality of mounting brackets 300 attach to its external rods 104. There may be two mounting brackets 300 mounted on the same pair of external rods 104. As shown in FIG. 5A, the two mounting brackets 300 may each have an air compressor 200 mounted on them.

Additionally, a plurality of mounting brackets 300 may be attached to different pairs of external rods 104. By way of example and not limitation, if an air tank 101 has five external rods 104 symmetrically spaced apart on its outer surface, a mounting bracket 300 may be attached to the first and second external rods 104, and another mounting bracket 300 may be attached to the second and third external rods 104. Additionally, more mounting brackets 300 may be added to the external rods 104. As shown in FIG. 5A, two air compressors 200 may be mounted to mounting brackets 300 on a first pair of external rods 104, and a manifold valve 216 may be mounted to a mounting bracket on a second pair of external rods, where the first and second pair of external rods share one rod. Mounting legs 322 may also be added to the fourth and fifth external rods to provide foundation when placing the air tank system 100 on the ground.

As shown in FIG. 5B, the mounting brackets 300 may slide to one end of the air tank 101 along with the components that are attached to the brackets. This may be done if there exists limited space where the air tank system 100 is supposed to be placed, such as a trunk of an automobile. A user may slide the mounting brackets 300 and the components attached to it in different positions along the air tank 101 to adapt to the space that is available inside the automobile when placing the air tank system 100 in there.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An air tank system comprising:
   an air tank having a tube-shaped hollow body, a first external rod disposed adjacent to an exterior surface of the hollow body, and a second external rod disposed adjacent to the exterior surface of the hollow body;
   an air compressor having a first mounting support and a second mounting support, each of the first and second mounting supports having a plurality of bolt holes formed in a bolt hole pattern;
   a mounting system for attaching the air compressor to the air tank, the mounting system having:
   a first member attached to and slidable on the first external rod and the second external rod of the air tank, the first member having a plurality of bolt holes formed in a bolt hole pattern configured to align and connect to the bolt hole pattern of the first mounting support of the air compressor;

a second member attached to and slidable on the first external rod and the second external rod of the air tank, the second member having a plurality of bolt holes formed in a bolt hole pattern configured to align and connect to the bolt hole pattern of the second mounting support of the air compressor; and wherein the first and second members are slidable independent of each other and configured to attach the air compressor to the air tank through the bolt holes of the first member and the bolt holes of the second member; and a plurality of mounting legs attached to and slidable on a third external rod of the air tank and a fourth external rod of the air tank.

2. The air tank system of claim 1, wherein the first and second external rods are spaced apart from the exterior surface of the hollow body of the air tank.

3. The air tank system of claim 1, wherein the first member and the second member each have a bracket tightener to fix the mounting bracket system in a desired location on the first and second external rods.

4. The air tank system of claim 1, wherein a first end of the hollow body of the air tank is covered by a first end cap having at least one end port, and a second end of the hollow body of the air tank is covered by a second end cap having at least one end port.

5. The air tank system of claim 1, wherein the first and second external rods are made from a billet metal.

6. An air tank system comprising:
   an air tank having a tube-shaped hollow body, a first external rod disposed adjacent to an exterior surface of the hollow body, and a second external rod disposed adjacent to the exterior surface of the hollow body;
   an air compressor having a first mounting support and a second mounting support, each of the first and second mounting supports having a plurality of bolt holes formed in a bolt hole pattern; and
   a mounting system for attaching the air compressor to the air tank, the mounting system having:
      a first member attached to and slidable on the first external rod and the second external rod of the air tank, the first member having a plurality of bolt holes formed in a bolt hole pattern configured to align and connect to the bolt hole pattern of the first mounting support of the air compressor;
      a second member attached to and slidable on the first external rod and the second external rod of the air tank, the second member having a plurality of bolt holes formed in a bolt hole pattern configured to align and connect to the bolt hole pattern of the second mounting support of the air compressor; and
      wherein the first and second members are slidable independent of each other and configured to attach the air compressor to the air tank through the bolt holes of the first member and the bolt holes of the second member;
   wherein a first plurality of dampened rubber rings are incorporated between the bolt holes of the first mounting support of the air compressor and the bolt holes of the first member of the mounting system for attaching the air compressor to the mounting system;
   wherein a second plurality of dampened rubber rings are incorporated between the bolt holes of the second mounting support of the air compressor and the bolt holes of the second member of the mounting system for attaching the air compressor to the mounting system.

7. An air tank system comprising:
   an air tank having a tube-shaped hollow body, a first external rod disposed adjacent to an exterior surface of the hollow body, and a second external rod disposed adjacent to the exterior surface of the hollow body;
   an air compressor having a first mounting support and a second mounting support, each of the first and second mounting supports having a plurality of bolt holes formed in a bolt hole pattern;
   a first mounting bracket system for attaching the air compressor to the air tank, the first mounting bracket system having:
      a first member attached to and slidable on the first external rod and the second external rod of the air tank, the first member having a plurality of bolt holes formed in a bolt hole pattern configured to align and connect to the bolt hole pattern of the first mounting support of the air compressor;
      a second member attached to and slidable on the first external rod and the second external rod of the air tank, the second member having a plurality of bolt holes formed in a bolt hole pattern configured to align and connect to the bolt hole pattern of the second mounting support of the air compressor;
      wherein the first and second members are slidable independent of each other and configured to attach the air compressor to the air tank through the bolt holes of the first member and the bolt holes of the second member;
   a second mounting bracket system having a first member and a second member, each of the first and second members of the second mounting bracket system attached to and slidable on the first and second external rods of the air tank; and
   a third mounting bracket system attached to and slidable on the first external rod and a third external rod of the air tank.

8. An air tank system comprising:
   an air tank having a tube-shaped hollow body and a plurality of external rods disposed adjacent to an exterior surface of the hollow body, the plurality of external rods having a first external rod, a second external rod, a third external rod and a fourth external rod;
   an air compressor having a first mounting support and a second mounting support;
   a mounting system for attaching the air compressor to the air tank, the mounting system having:
      a first member attached to and slidable on the first external rod and the second external rod of the air tank, the first member attachable to the first mounting support of the air compressor;
      a second member attached to and slidable on the first external rod and the second external rod of the air tank, the second member attachable to the second mounting support of the air compressor, and the second member configured to be slidable independent of the first member of the mounting system;
   a first mounting leg attached to and slidable on the third external rod and the fourth external rod of the air tank, the first mounting leg having a main body portion between a first sliding section of the first mounting leg and a second sliding section of the first mounting leg; and
   a second mounting leg attached to and slidable on the third external rod and the fourth external rod of the air tank, the second mounting leg having a main body portion between a first sliding section of the second mounting leg and a second sliding section of the second mounting leg.

9. The air tank system of claim 8, wherein the first member has a main body between a first sliding section of the first member and a second sliding section of the first member, and the second member has a main body between a first sliding section of the second member and a second sliding section of the second member.

10. The air tank system of claim 9, wherein the main body of the first member has a bolt hole pattern to align with a corresponding bolt hole pattern on the first mounting support of the air compressor.

11. The air tank system of claim 10, wherein the main body of the second member has a bolt hole pattern to align with a corresponding bolt hole pattern on the second mounting support of the air compressor.

12. The air tank system of claim 11, further comprising a mounting bracket attached to and slidable on the first external rod and a fifth external rod of the plurality of external rods of the air tank.

13. The air tank system of claim 8, wherein each of the plurality of external rods is spaced apart from the exterior surface of the hollow body.

14. The air tank system of claim 8, wherein the first member and the second member each have a bracket tightener to fix the mounting system in a desired location on the first and second external rods.

15. The air tank system of claim 8, wherein a first end of the hollow body of the air tank is covered by a first end cap having at least one end port, and a second end of the hollow body of the air tank is covered by a second end cap having at least one end port.

16. The air tank system of claim 8, wherein the plurality of external rods are made from a billet metal.

* * * * *